US007729052B2

(12) United States Patent  (10) Patent No.: US 7,729,052 B2
Cotton  (45) Date of Patent: Jun. 1, 2010

(54) NON-PLANAR OPTICAL DIFFRACTION GRATING HAVING AN ARBITRARY PARALLEL GROOVE PROFILE

(76) Inventor: Christopher T. Cotton, 21 Old Brook Trail, Honeoye Falls, NY (US) 14472

( * ) Notice: Subject to any disclaimer, the term of this patent is extended or adjusted under 35 U.S.C. 154(b) by 0 days.

(21) Appl. No.: 11/173,044

(22) Filed: Jul. 1, 2005

(65) Prior Publication Data

US 2007/0002445 A1   Jan. 4, 2007

(51) Int. Cl.
G02B 5/18 (2006.01)
(52) U.S. Cl. ........................ 359/574; 359/573; 359/575; 359/569
(58) Field of Classification Search ................. 359/569, 359/570, 571, 573, 574, 575
See application file for complete search history.

(56) References Cited

U.S. PATENT DOCUMENTS 5,151,826 A * 9/1992 Pasco .......................... 359/742
5,497,269 A * 3/1996 Gal ............................. 359/615
5,638,212 A * 6/1997 Meyers et al. ................ 359/569
5,801,795 A * 9/1998 Ogino ............................ 349/5
5,880,834 A   3/1999 Chrisp
6,388,811 B1 * 5/2002 Iizuka et al. ................. 359/570
6,480,333 B1  11/2002 Maker et al.

* cited by examiner

Primary Examiner—Audrey Y Chang
(74) Attorney, Agent, or Firm—Reed Smith LLP; William J. McNichol; Carl Pierce

(57) ABSTRACT

An optical diffraction grating having a superior ultra-precise non-planar surface shape desired in extremely sensitive and complex optical imaging devices (e.g. spectrometers or hyperspectral imagers) is provided. The optical diffraction grating comprises a substrate having a plurality of substantially parallel grooves, wherein each of the grooves includes a plurality of substantially parallel sub-grooves. A non-planar substrate surface shape is defined by a combination of the grooves. A groove profile is defined by a combination of the sub-grooves within a corresponding one of the grooves. In a preferred method of manufacturing the optical diffraction grating, a rotating spindle technique would be employed.

56 Claims, 7 Drawing Sheets

NON-PLANAR OPTICAL DIFFRACTION GRATING HAVING AN ARBITRARY PARALLEL GROOVE PROFILE

FIELD OF THE INVENTION

The present invention relates generally to the fields of spectroscopy and hyperspectral imagery, and, more specifically, to non-planar optical diffraction gratings for use in optical devices such as, for example, spectrometers or hyperspectral imagers.

BACKGROUND OF THE INVENTION

The elements that shape a propagating wavefront are a key part of any optical system. Diffractive optical elements offer major advantages over conventional refractive optical elements in terms of size, weight, and cost. Bulky groups of classical optical elements, such as lenses, mirrors, beam splitters and filters, are replaced by a single diffractive optical element. As a result, optical systems can be made smaller, more robust and less expensive. In addition, these devices can perform complex waveshaping and wavelength dispersing functions that are often beyond the capabilities of conventional elements.

A diffractive optical element includes a pattern of structures which can modulate and transform light in a predetermined way. The element utilizes precision surfaces that have a series of grooves, which have small steps at the groove boundaries. The placement of these grooves allows an optical designer to precisely shape the emerging optical wavefront. The required step heights at the groove boundaries are typically between 1 and 10 µm. A scoring tool with very high resolution and large flexibility is needed to manufacture these micro-structures having arbitrary shapes.

As is widely known, convex and concave diffraction-gratings are useful in the field of spectroscopy. Concave diffraction gratings are used as a stand-alone device for generating either a Roland Circle spectrometer or a spectrometer that has aberration correction characteristics that are caused by using a variable groove spacing across the surface of the part. Convex diffraction gratings are useful in systems that use an Offner spectrometer design. Instead of a diamond-turning technique such as described above, the manufacture of these gratings is often done through either the use of holographic techniques to obtain the desired groove spacings with a near sinusoidal groove profile, or a holographic technique for generating the groove spacing and an ion etching process to create a blazed groove profile. There are also techniques for generating concave-ruled diffraction gratings that involve elaborate mechanical geometries. Ruled diffraction gratings are generally manufactured by using a single (non-turning) diamond 3 (see FIG. 1 which illustrates a prior art convex diffraction grating 1) that has an angled tip 4. The diamond tip is dragged across the substrate having a convex surface 2 and creates a single groove 5 with each pass of the diamond 3. This works sufficiently for planar gratings where the groove angle does not change across the grating. In this case, the diamond can easily be drawn across the planar grating surface while maintaining the same angle between the diamond tip and the substrate. However, in the case of a non-planar grating, a precise mechanical system is required to maintain the angle between the diamond tip and the non-planar substrate.

Thus, it is desirable to provide a non-planar optical diffraction grating which is able to overcome the above disadvantages and which can be easily manufactured in an ultra-precise and efficient fashion.

It is therefore desirable to provide a non-planar optical diffraction grating having grooves which include a plurality of sub-grooves that can be utilized in various optical imaging devices (e.g. spectrometers or hyperspectral imagers) which require an extremely sensitive diffraction grating, and that does not suffer from the above drawbacks experienced by diffraction gratings having only grooves (i.e. no sub-grooves). Additionally, while addressing these problems, the optical diffraction grating having grooves which include a plurality of sub-grooves of the present invention will simultaneously provide an optical diffraction grating having a superior ultra-precise non-planar surface shape desired in extremely sensitive and complex optical imaging devices.

These and other advantages of the present invention will become more fully apparent from the detailed description of the invention hereinbelow.

SUMMARY OF THE INVENTION

The present invention is directed to a non-planar optical diffraction grating, comprising a substrate having a plurality of substantially parallel grooves, wherein each of the grooves includes a plurality of substantially parallel sub-grooves. A substrate surface shape is defined by a combination of the grooves, wherein the substrate surface shape is non-planar. A groove profile is defined by a combination of the sub-grooves within a corresponding one of the grooves. The dimensions of the sub-grooves are extremely small to thereby form an optical diffraction grating having a superior ultra-precise non-planar surface shape desired in extremely sensitive and complex optical imaging devices (e.g. spectrometers or hyperspectral imagers).

In an exemplary method of the present invention, the plurality of sub-grooves are formed using a rotating spindle technique. The spindle technique comprises positioning a substrate on a support which rotates about a spindle axis. The substrate preferably has a center of curvature or axis of symmetry which is substantially coincident with the spindle axis such that the substrate is rotated about the center of curvature or axis of symmetry during the rotation of the substrate about the spindle axis while the substrate is on the support. Also, a distance from the spindle axis to a surface of the substrate measured in a direction perpendicular to the spindle axis is preferably substantially equal to a radius of curvature of the substrate.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
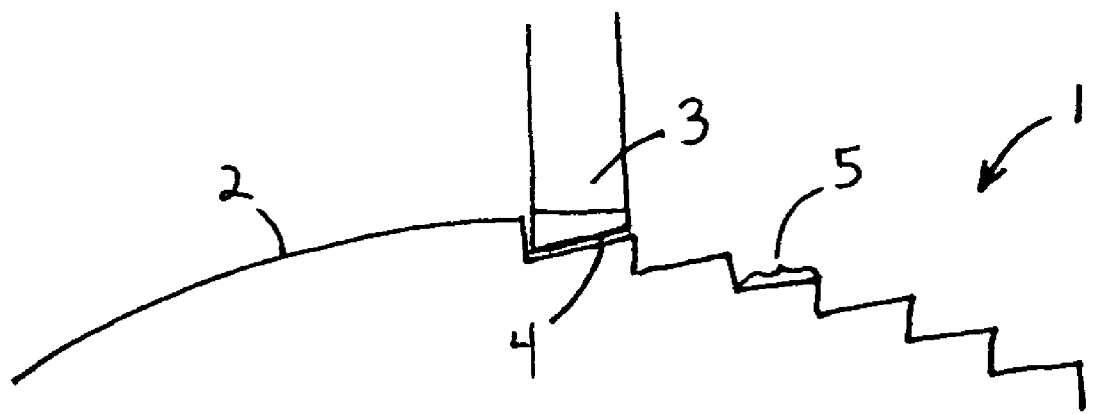
FIG. 1 is a partial cross-sectional side view of a prior art convex diffraction grating.

It is to be understood that the figures and descriptions of the present invention may have been simplified to illustrate elements that are relevant for a clear understanding of the present invention, while eliminating, for purposes of clarity, other elements found in a typical optical imaging device having a diffraction grating. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

In a preferred method of the present invention, the manufacture of a non-planar diffraction grating is performed using a precision rotating spindle technique which includes employing a small-radius tool to cut sub-grooves within a substrate to thereby form the grooves of an ultra-precise diffraction grating. This preferred method of manufacturing will be explained in more detail below with respect to FIG. 10.

Figure 2:
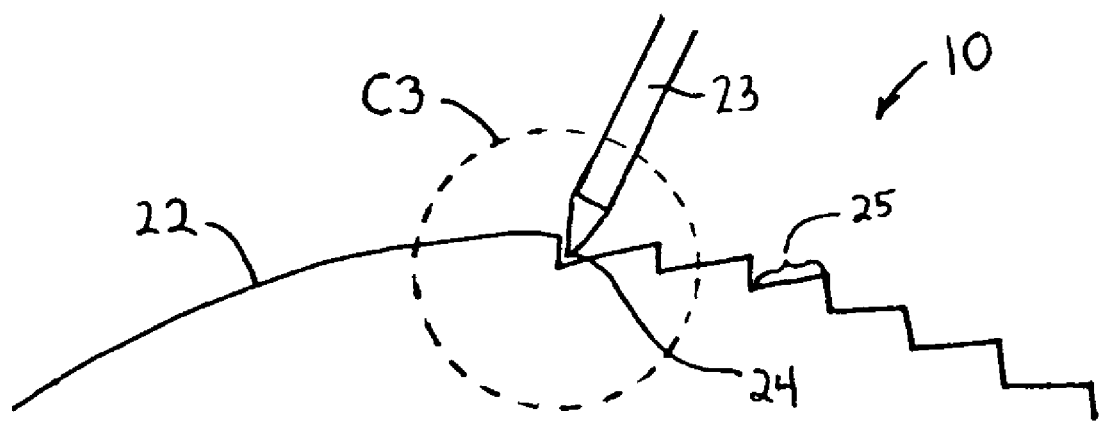
FIG. 2 is a partial cross-sectional side view of a convex diffraction grating, in accordance with a preferred embodiment of the present invention.

FIG. 2 is a partial cross-sectional side view of a non-planar diffraction grating 10. In particular, FIG. 2 illustrates a convex substrate 22. The substrate 22 may comprise any optical material which typically comprises diffraction gratings such as, for example, calcium fluoride, germanium, zinc sulfide, zinc selenide, gold, nickel, silver, aluminum, etc. . . . Other alternative optical materials for the diffraction grating composition may of course be contemplated within the scope of this invention. It is noted that in this preferred embodiment, substrate 22 is convex (i.e. before formation of grooves 25/sub-grooves 30 which are discussed below). However, other non-planar shapes may be contemplated within the scope of this invention. For example, substrate 22 may alternatively be concave, substantially spherical, or substantially toroidal.

Figure 3:
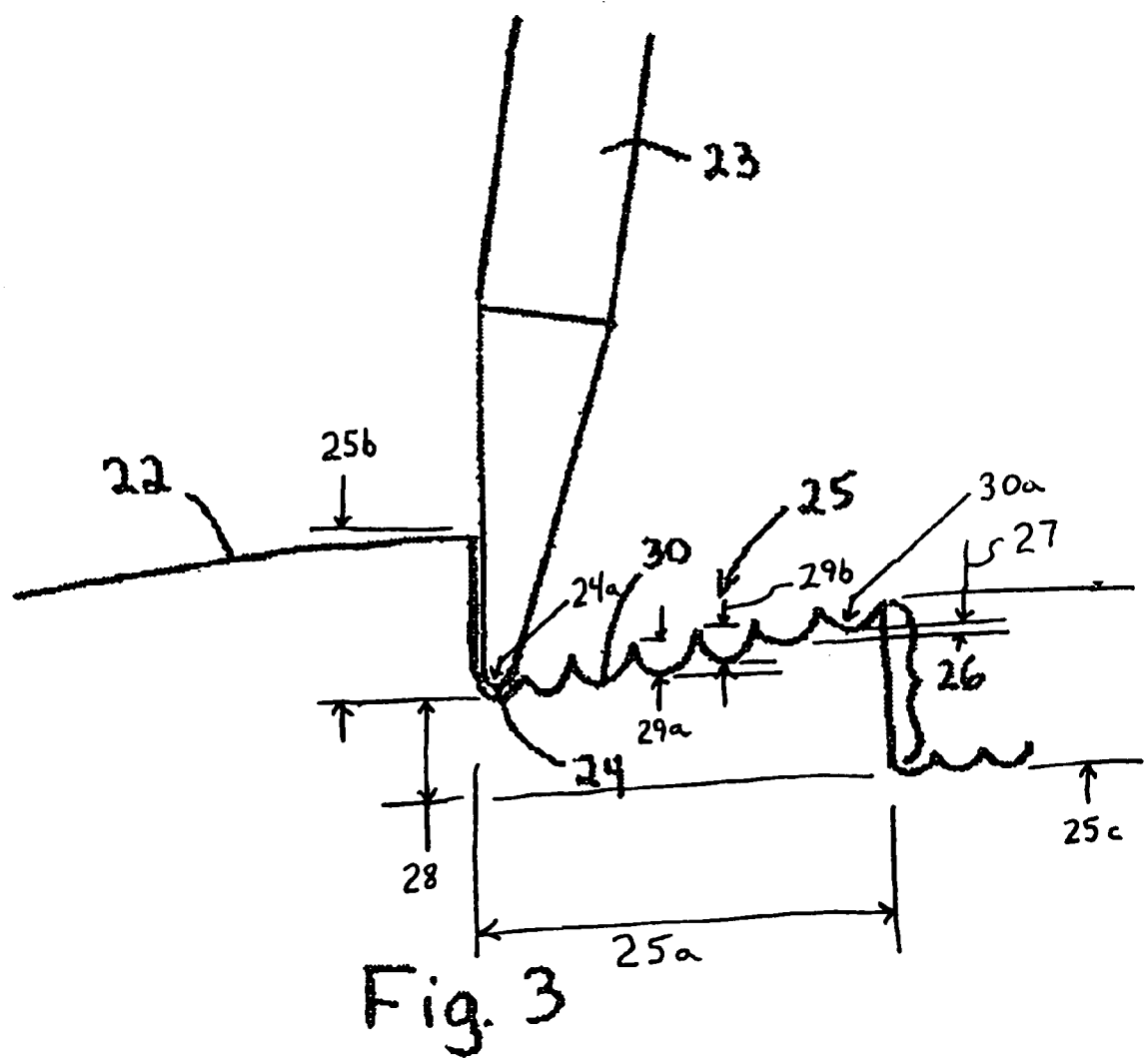
FIG. 3 is an enlarged cross-sectional side view of the diffraction grating illustrated in FIG. 2 and taken within the circle labeled C3 in FIG. 2, in accordance with a preferred embodiment of the present invention.

FIG. 3 is an enlarged cross-sectional side view of the diffraction grating illustrated in FIG. 2 and taken within the circle labeled C3 in FIG. 2. FIGS. 2 and 3 illustrate a tool 23 comprising a tip 24. Tip 24 preferably comprises an extremely hard composition such as, for example, diamond. Tip 24 preferably has a radius of curvature 24a of between about 0.5 µm to 5 µm and is used to form a plurality of sub-grooves 30 (see FIG. 3) having a sub-groove radius of curvature 30a within the substrate 22. Each groove 25 is created by forming a plurality of sub-grooves 30. In other words, each groove 25 includes a plurality of sub-grooves 30. The sub-grooves 30 are substantially parallel with respect to each other and therefore, the grooves 25 are similarly substantially parallel with respect to each other. The sidewall 26 (FIG. 3) of a groove may also be formed by at least one sub-groove 30 (not shown). The angle that the tool/tip makes with respect to the substrate 22 is preferably fixed during cutting of the entire substrate 22. However, the angle may alternatively be varied during the cutting process, for example, to reach portions of the grooves 25 that are difficult to access such as, for example, sidewall 26 or extreme curved portions (see the upper part of concave groove 25 in FIG. 6).

A width 25a of at least one of the grooves is preferably between about 10 µm to 100 µm. A width of at least one of the sub-grooves is preferably between about 0.5 µm to 2 µm. A distance 27 between a deepest portion of at least one of the sub-grooves and a deepest portion of an adjacent one of the sub-grooves within a corresponding one of the grooves is preferably between about 0.01 µm to 0.1 µm. A depth 25b of at least one of the grooves is preferably between about 0.25 µm to 10 µm. A depth of at least one of the sub-grooves is preferably between about 0.001 µm to 0.1 µm. For purposes of this disclosure, the depth of a sub-groove refers to the height between the deepest portion of the sub-groove to the highest portion of the space between adjacent sub-grooves within the same groove. Also, for purposes of this disclosure, the depths of the grooves are measured along a direction perpendicular to the substrate surface at the measured point. Further, for purposes of this disclosure, the depths of the sub-grooves are measured along a direction perpendicular to the surface of the groove defined by the same sub-grooves. A difference in depth between at least one of the grooves and an adjacent one of the grooves (depth 25b minus depth 25c) is preferably between about 0.25 µm to 10 µm. A difference in height between at least one of the sub-grooves and an adjacent one of the sub-grooves (height 29a minus height 29b) within a corresponding one of the grooves is preferably between about 0.01 µm to 1 µm. For purposes of this disclosure, the difference in height between two adjacent sub-grooves within the groove is measured along a direction perpendicular to the substrate surface in the vicinity of the measured sub-grooves. A ratio of a difference in depth between at least one of the grooves and an adjacent one of the grooves, and a difference in depth between at least one of the sub-grooves and an adjacent one of the sub-grooves within a corresponding one of the grooves is preferably at least 2:1, and is more preferably at least 5:1. At least one of the grooves includes preferably 2-40 of the sub-grooves.

A non-planar substrate surface shape is defined by a combination of the grooves 25. The substrate surface shape is preferably convex. However, other non-planar substrate surface shapes may be contemplated within the scope of this invention. For example, non-planar substrate surface shape may alternatively be concave, substantially spherical, substantially conic, or substantially toroidal. The grooves are oriented in substantially a first direction, and wherein the substrate surface shape is preferably substantially symmetric about an axis perpendicular to the first direction.

Figure 4:
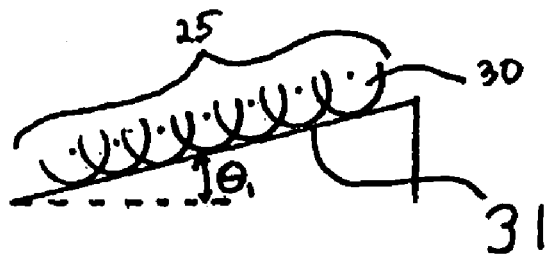
FIG. 4 is an enlarged cross-sectional side view of one of the grooves of the diffraction grating illustrating the formation of the sub-grooves in a small-angled linear fashion within the one groove, in accordance with a preferred embodiment of the present invention.
Figure 5:
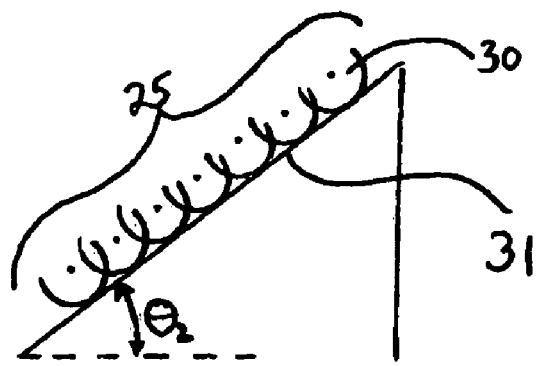
FIG. 5 is an enlarged cross-sectional side view of one of the grooves of the diffraction grating illustrating the formation of the sub-grooves in a large-angled linear fashion within the one groove, in accordance with a preferred embodiment of the present invention.

A groove profile is defined by a combination of the sub-grooves 30 within a corresponding one of the grooves 25. FIG. 4 illustrates an enlarged cross-sectional side view of one of the grooves 25 of the diffraction grating illustrating the formation of the sub-grooves 30 in a small-angled (blaze angle=$\theta_1$) linear fashion within the one groove (i.e. a linear groove profile 31). FIG. 5 illustrates a large-angled (blaze angle=$\theta_2$) linear groove profile. Blaze angles $\theta_1$ and $\theta_2$ can vary with a preferable range of between about 0.1 to 45 degrees. A blaze angle of the groove profile can differ from a blaze angle of a groove profile of an adjacent one of the grooves. This difference can be at least 0.02 degrees.

Figure 6:
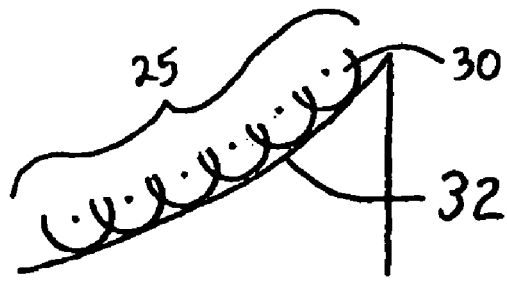
FIG. 6 is an enlarged cross-sectional side view of one of the grooves of the diffraction grating illustrating the formation of the sub-grooves in a concave fashion within the one groove, in accordance with a preferred embodiment of the present invention.
Figure 7:
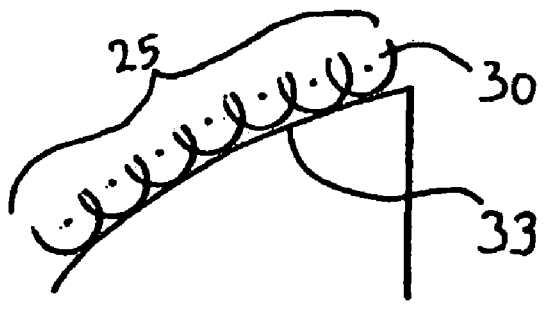
FIG. 7 is an enlarged cross-sectional side view of one of the grooves of the diffraction grating illustrating the formation of the sub-grooves in a convex fashion within the one groove, in accordance with a preferred embodiment of the present invention.

The groove profile can take on non-linear profiles. For example, FIG. 6 illustrates an exemplary concave groove profile 32, whereas FIG. 7 illustrates an exemplary convex groove profile 33. Regardless of the shape, the groove profile of one of the grooves may differ from a groove profile of an adjacent one of the grooves.

It is to be understood that the sub-grooves (i.e. within one corresponding groove) may have the same distance between each other or, alternatively, varying distances between each other. Moreover, the sub-grooves (i.e. within one corresponding groove) may each have the same width, or alternatively, may each have varying widths. Similarly, a width of at least one of the grooves may differ from a width of an adjacent one of the grooves.

Figure 8:
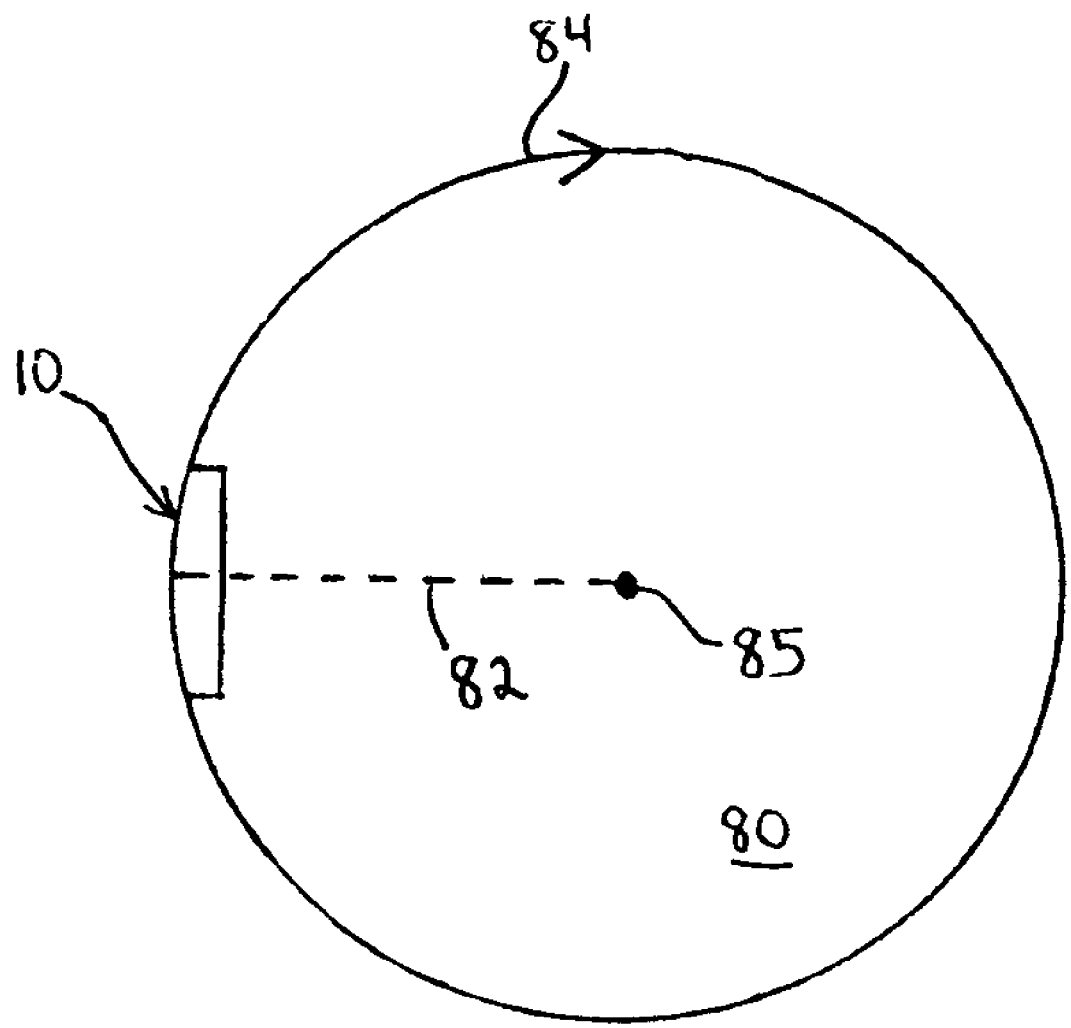
FIG. 8 is a schematic side view illustrating a rotating spindle technique used to manufacture a convex diffraction grating, in accordance with a preferred embodiment of the present invention.
Figure 9:
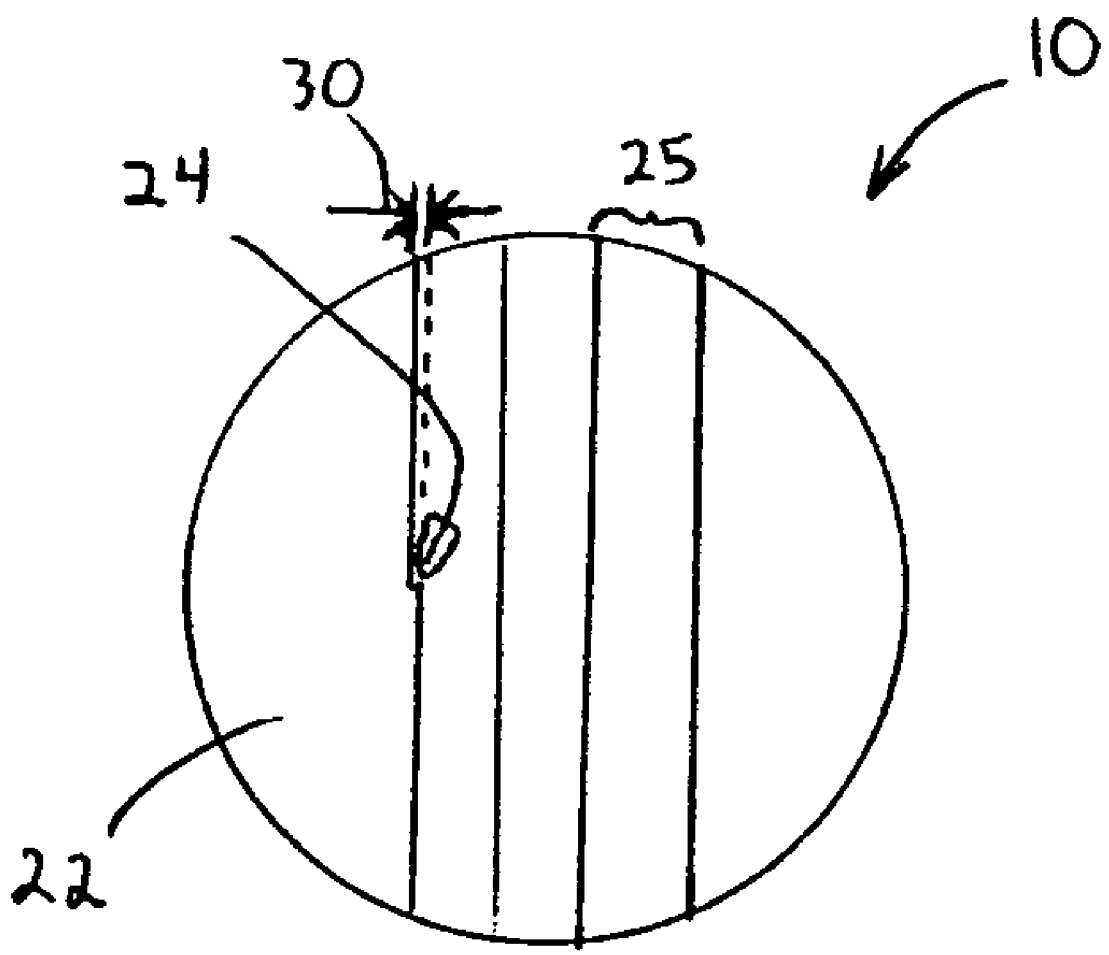
FIG. 9 is a plan view illustrating the formation of the grooves/sub-grooves during the rotating spindle technique used to manufacture a convex diffraction grating, in accordance with a preferred embodiment of the present invention.

FIG. 8 is a schematic side view illustrating a rotating spindle technique used to manufacture a convex diffraction grating 10. The convex substrate is mounted to a support spindle 80 (i.e. either directly or via a platform) such that the center of curvature or axis of symmetry of the substrate is substantially coincident with the spindle axis 85, and the distance 82 to the surface of the substrate (as measured perpendicularly from the spindle axis 85) is substantially equal to the radius of curvature of the substrate. The substrate is then rotated about substantially its center of curvature or axis of symmetry by the spindle (see path 84). The cutting tool's tip (which is preferably shaped like a "v" with a very sharp tip and is preferably comprised of diamond) is mounted so that the point of the "v" is used to cut the substrate and one of the sides of the v is preferably substantially perpendicular to the axis of rotation of the spindle. Maintaining one side of the cutting tip substantially perpendicular to the axis of rotation of the spindle allows the tip to cut relatively higher angles on one side of the groove. The groove profile is achieved by moving the cutting tool parallel to the axis of the spindle while controlling the tool path motion perpendicular to the spindle axis to create the desired groove profile. In this way, the tool passes over the substrate surface many times for each groove thus making each of the grooves with the correct angle with respect to the normal of the substrate surface. The grooves are made to be parallel and can be made with a varying groove spacing or angle. Additionally the substrate for the diffraction grating 10 does not necessarily need to be spherical. This system can be used to make gratings that are toroidal or aspheric, providing that the axis of rotation of the substrate is substantially coincident with the axis of rotation of the spindle. FIG. 9 is a plan view illustrating the formation of the grooves 25/sub-grooves 30 during this rotating spindle technique. It is noted that the spindle is described and shown in FIG. 8 as rotating in a vertical plane. However, the spindle can alternatively rotate in other planes with corresponding changes to the remaining elements of the.

In an alternative process, a concave grating can alternatively be manufactured using a similar process as the convex grating method discussed above. The main difference being that the substrate could be placed on the spindle such that the surface which is to be formed with the grooves/sub-grooves faces the spindle axis. The other surface alignment procedures mentioned in the method above would be followed in a similar fashion.

Figure 10:
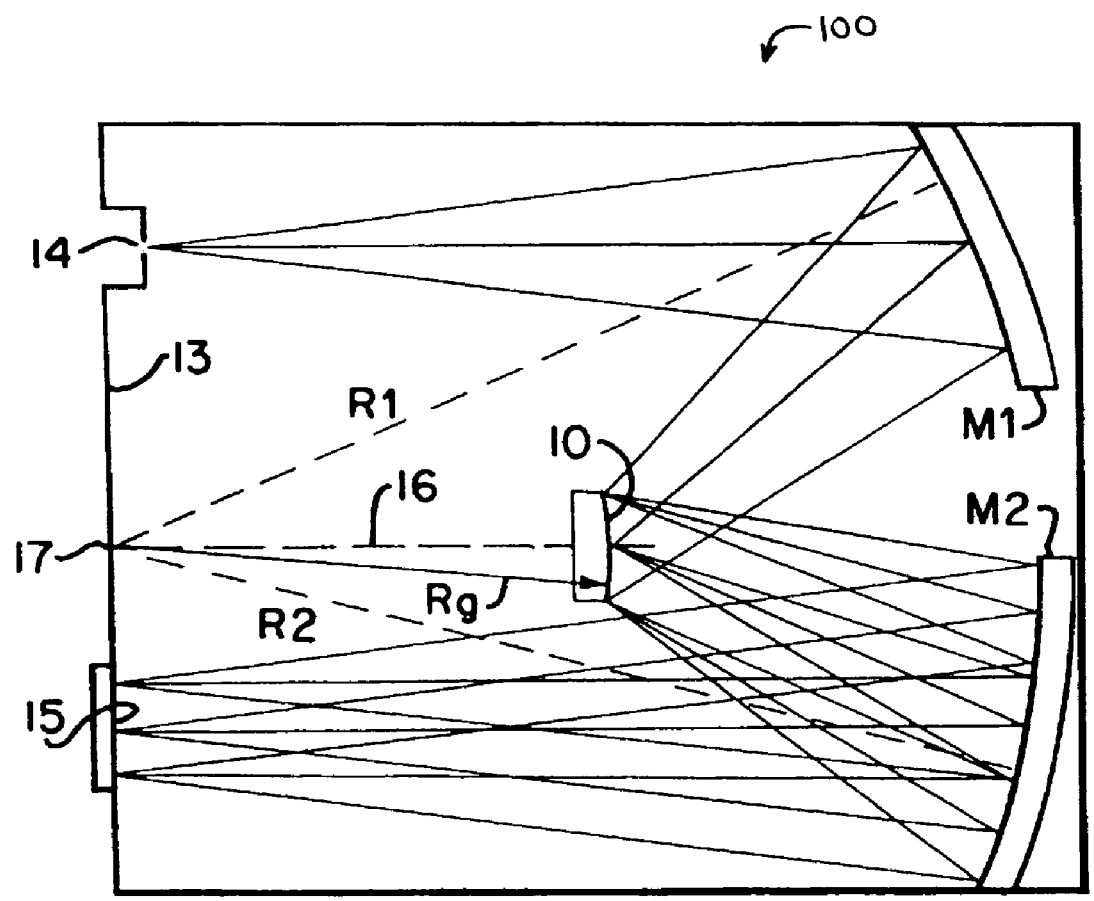
FIG. 10 is a schematic side view illustrating an optical imaging spectrometer including a non-planar diffraction grating, in accordance with a preferred embodiment of the present invention.

Illustrated in FIG. 10 is an optical imaging spectrometer 100 in accordance with an exemplary embodiment of the present invention. This particular spectrometer 100 includes a convex spherical reflection diffraction grating 10 and two separate concave spherical mirrors M1 and M2 shown diagrammatically in a small (9.14×7.62×3.56 cm³) camera box 13 with a 10 mm entrance slit 14 and a focal plane 15 for a solid-state pixel array or photographic film plate on which vertical spectra are projected with a high degree of horizontal spatial resolution of spectra in vertical stripes from a horizontal slice of an image field entering the slit 14. FIG. 10 shows the axis 16 of the convex reflection diffraction grating 10 perpendicular to a plane that includes the radial center 17 of the convex diffraction grating and the focal plane 15. The convex diffraction grating 10 has a reflection diffraction grating with equi-spaced grooves. These grooves are perpendicular to the plane of symmetry passing through the center of the slit 14 and the focal plane 15, i.e., parallel to the entrance slit 14 centered on that plane of symmetry. $R_g$ is the radius of curvature of the diffraction grating 10.

Spectrometer 100 includes the use of separate spherical mirrors M1 and M2, one on each side of the axis 16 of the convex diffraction grating 10. Mirrors M1 and M2 have the same radius (R1=R2). The spectrometer 100 utilizing diffraction grating 10 of the present invention provides superior precise performance. Of course, other types of spectrometer configurations (e.g. having any number, types, and/or shapes of optical elements, and/or having mirrors with non-equal radii) may be contemplated. Such implementations are considered to be within the scope of the present invention.

For purposes of this disclosure, various non-planar substrate surface shapes (spherical, concave, convex, toroidal, conic, etc.) may be employed provided that the shape has a rotational axis of symmetry.

Those of ordinary skill in the art will recognize that various modifications and variations may be made to the embodiments described above without departing from the spirit and scope of the present invention. For example, although the diffraction grating is exemplified using a spectrometer 100 in FIG. 10, other optical imaging devices such as, for example, hyperspectral imagers may alternatively employ a diffraction grating. Such implementations are considered to be within the scope of the present invention. Also, instead of a cutting process to form the sub-grooves 30/grooves 25, other processes such as, for example, electron beam lithography may alternatively be employed. Such implementations are considered to be within the scope of the present invention. Also, the substrate has been described above as comprising a single composition, but it may alternatively additionally be formed on a base which may comprise, for example, a metal, epoxy, resin, polymer, plastic, or combinations thereof. Further, the embodiment above depicted in FIG. 8 describes the manufacture of a substrate directly. However, it is to be understood that the present invention may also be used in a similar fashion to fabricate a master (made of, for example, a metal such as nickel or aluminum) which, in turn, would be used to replicate the substrate therefrom. Such implementation is considered to be within the scope of the present invention. It is therefore to be understood that the present invention is not limited to the particular embodiments disclosed above, but it is intended to cover such modifications and variations as defined by the following claims.

What is claimed is:

1. A non-planar optical diffraction grating, comprising:
   a non-planar substrate having a plurality of substantially parallel grooves, wherein each of the grooves includes a plurality of substantially parallel sub-grooves, wherein at least one of said sub-groups has a curved profile;
   wherein a substrate surface shape is defined by a combination of the grooves, and wherein the substrate surface shape is non-planar;
   wherein a groove profile is defined for each of said substantially parallel grooves, said groove profiles defined by the sub-grooves within said groove; and
   wherein the difference in depth between at least one of the grooves and an adjacent one of the grooves is preferably between about 0.25 µm and 10 µm.

2. The diffraction grating of claim 1, wherein said at least one of said sub-grooves having a curved profile has a radius of curvature of between about 0.5 µm to 5 µm.

3. The diffraction grating of claim 1, wherein a width of at least one of the grooves is between about 10 µm to 100 µm.

4. The diffraction grating of claim 1, wherein a width of at least one of the sub-grooves is between about 0.5 µm to 2 µm.

5. The diffraction grating of claim 1, wherein the difference in depth between a deepest portion of at least one of the sub-grooves and a deepest portion of an adjacent one of the sub-grooves within a corresponding one of the grooves is between about 0.01 µm to 0.1 µm.

6. The diffraction grating of claim 1, wherein a depth of at least one of the grooves is between about 0.25 µm to 10 µm.

7. The diffraction grating of claim 1, wherein a depth of at least one of the sub-grooves is between about 0.001 µm to 0.1 µm.

8. The diffraction grating of claim 1, wherein a difference in height between at least one of the sub-grooves and an adjacent one of the sub-grooves within a corresponding one of the grooves is between about 0.01 µm to 1 µm.

9. The diffraction grating of claim 1, wherein a ratio of a difference in depth between at least one of the grooves and an adjacent one of the grooves, and a difference in depth between at least one of the sub-grooves and an adjacent one of the sub-grooves within a corresponding one of the grooves is at least 2:1.

10. The diffraction grating of claim 1, wherein a ratio of a difference in depth between at least one of the grooves and an adjacent one of the grooves, and a difference in depth between at least one of the sub-grooves and an adjacent one of the sub-grooves within a corresponding one of the grooves is at least 5:1.

11. The diffraction grating of claim 1, wherein at least one of the grooves includes 2-40 of the sub-grooves.

12. The diffraction grating of claim 1, wherein the substrate surface shape is concave.

13. The diffraction grating of claim 1, wherein the substrate surface shape is convex 14. The diffraction grating of claim 1, wherein the substrate surface shape is substantially spherical.

15. The diffraction grating of claim 1, wherein the substrate surface shape is substantially toroidal.

16. The diffraction grating of claim 1, wherein the grooves are oriented in substantially a first direction, and wherein the substrate surface shape is substantially symmetric about an axis perpendicular to the first direction.

17. The diffraction grating of claim 1, wherein the groove profile is concave.

18. The diffraction grating of claim 1, wherein the groove profile is convex.

19. The diffraction grating of claim 1, wherein a blaze angle of the groove profile is between about 0.1 to 45 degrees.

20. The diffraction grating of claim 1, wherein a blaze angle of the groove profile differs from a blaze angle of a groove profile of an adjacent one of the grooves.

21. The diffraction grating of claim 1, wherein a blaze angle of the groove profile differs from a blaze angle of a groove profile of an adjacent one of the grooves by at least 0.02 degrees.

22. The diffraction grating of claim 1, wherein the groove profile differs from a groove profile of an adjacent one of the grooves.

23. The diffraction grating of claim 1, wherein a width of at least one of the grooves differs from a width of an adjacent one of the grooves.

24. A spectrometer including the diffraction grating of claim 1.

25. A hyperspectral imager including the diffraction grating of claim 1.

26. A method of manufacturing a non-planar optical diffraction grating, comprising:
    providing a plurality of substantially parallel grooves in a non-planar substrate, wherein each of the grooves includes a plurality of substantially parallel sub-grooves which are formed in the substrate, wherein at least one of said sub-grooves has a curved profile;
    wherein a substrate surface shape is defined by a combination of the grooves, and wherein the substrate surface shape is non-planar; and
    wherein a groove profile is defined for each of said substantially parallel grooves, said groove profiles defined by the sub-grooves within said groove and
    wherein the difference in depth between at least one of the grooves and an adjacent one of the grooves is preferably between about 0.25 µm and 10 µm.

27. The method of claim 26, wherein the plurality of sub-grooves are formed using a rotating spindle technique, and wherein the spindle technique comprises positioning the substrate on a support which rotates about a spindle axis.

28. The method of claim 27, wherein the substrate has a center of curvature or axis of symmetry which is substantially coincident with the spindle axis such that the substrate is rotated about the center of curvature or axis of symmetry during the rotation of the substrate about the spindle axis while the substrate is on the support.

29. The method of claim 28, wherein a distance from the spindle axis to a surface of the substrate measured in a direction perpendicular to the spindle axis is substantially equal to a radius of curvature of the substrate.

30. The method of claim 26, wherein the plurality of sub-grooves are formed using a tool comprising a tip having a radius of curvature of between about 0.5 µm to 5 µm.

31. The method of claim 27, wherein the spindle technique comprises forming the plurality of sub-grooves using a tool comprising a tip having a radius of curvature of between about 0.5 µm to 5 µm.

32. The method of claim 31, wherein the spindle technique comprises moving the tool in a direction parallel to the spindle axis while moving the tool in a direction perpendicular to the spindle axis to vary location and depth, respectively, of the sub-grooves during formation of the sub-grooves to thereby form the groove profile.

33. The method of claim 26, wherein a width of at least one of the grooves is between about 10 µm to 100 µm.

34. The method of claim 26, wherein a width of at least one of the sub-grooves is between about 0.5 μm to 2 μm.

35. The method of claim 26, wherein the difference in depth between a deepest portion of at least one of the sub-grooves and a deepest portion of an adjacent one of the sub-grooves within a corresponding one of the grooves is between about 0.01 μm to 0.1 μm.

36. The method of claim 26, wherein a depth of at least one of the sub-grooves is between about 0.001 μm to 0.1 μm.

37. The method of claim 26, wherein a difference in height between at least one of the sub-grooves and an adjacent one of the sub-grooves within a corresponding one of the grooves is between about 0.01 μm to 1 μm.

38. The method of claim 26, wherein a ratio of a difference in depth between at least one of the grooves and an adjacent one of the grooves, and a difference in depth between at least one of the sub-grooves and an adjacent one of the sub-grooves within a corresponding one of the grooves is at least 2:1.

39. The method of claim 26, wherein a ratio of a difference in depth between at least one of the grooves and an adjacent one of the grooves, and a difference in depth between at least one of the sub-grooves and an adjacent one of the sub-grooves within a corresponding one of the grooves is at least 5:1.

40. The method of claim 26, wherein at least one of the grooves includes 2-40 of the sub-grooves.

41. The method of claim 26, wherein the substrate surface shape is concave.

42. The method of claim 26, wherein the substrate surface shape is convex.

43. The method of claim 26, wherein the substrate surface shape is substantially spherical.

44. The method of claim 26, wherein the substrate surface shape is substantially toroidal.

45. The method of claim 26, wherein the grooves are oriented in substantially a first direction, and wherein the substrate surface shape is substantially symmetric about an axis perpendicular to the first direction.

46. The method of claim 26, wherein the groove profile is concave.

47. The method of claim 26, wherein the groove profile is convex.

48. The method of claim 26, wherein the groove profile is linear.

49. The method of claim 26, wherein a blaze angle of the groove profile is between about 0.1 to 45 degrees.

50. The method of claim 26, wherein a blaze angle of the groove profile differs from a blaze angle of a groove profile of an adjacent one of the grooves.

51. The method of claim 26, wherein a blaze angle of the groove profile differs from a blaze angle of a groove profile of an adjacent one of the grooves by at least 0.02 degrees.

52. The method of claim 26, wherein the groove profile differs from a groove profile of an adjacent one of the grooves.

53. The method of claim 26, wherein a width of at least one of the grooves differs from a width of an adjacent one of the grooves.

54. A spectrometer including the diffraction grating made by the method of claim 26.

55. A hyperspectral imager including the diffraction grating made by the method of claim 26.

56. The method of claim 26, wherein a depth of at least one of the grooves is between about 0.25 μm to 10 μm.

* * * * *